(12) United States Patent
Steiss (10) Patent No.: US 8,156,309 B2
(45) Date of Patent: Apr. 10, 2012

(54) TRANSLATION LOOK-ASIDE BUFFER WITH VARIABLE PAGE SIZES

(75) Inventor: Donald E. Steiss, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 450 days.

(21) Appl. No.: 11/874,866

(22) Filed: Oct. 18, 2007

(65) Prior Publication Data

US 2009/0106523 A1    Apr. 23, 2009

(51) Int. Cl.
*G06F 12/00* (2006.01)

(52) U.S. Cl. ........ 711/207; 711/122; 711/140; 711/168; 711/169

(58) Field of Classification Search .................. 711/205, 711/207

See application file for complete search history.

(56) References Cited

U.S. PATENT DOCUMENTS

| | | | | |
|---|---|---|---|---|
| 5,526,504 A * | 6/1996 | Hsu et al. | | 711/207 |
| 5,930,359 A * | 7/1999 | Kempke et al. | | 713/160 |
| 6,233,652 B1 * | 5/2001 | Mathews et al. | | 711/108 |
| 6,490,671 B1 * | 12/2002 | Frank et al. | | 711/207 |
| 6,678,815 B1 | 1/2004 | Mathews et al. | | |
| 6,681,312 B1 | 1/2004 | Maekawa | | |
| 6,725,337 B1 * | 4/2004 | Sander et al. | | 711/133 |
| 7,043,600 B2 * | 5/2006 | Chow et al. | | 711/108 |
| 7,093,100 B2 * | 8/2006 | Bridges et al. | | 711/207 |
| 7,117,290 B2 * | 10/2006 | Shen et al. | | 711/3 |
| 7,426,626 B2 * | 9/2008 | Augsburg et al. | | 711/207 |
| 2004/0037322 A1 | 2/2004 | Sukonik et al. | | |
| 2006/0143374 A1 * | 6/2006 | Kottapalli et al. | | 711/108 |
| 2006/0206686 A1 * | 9/2006 | Banerjee et al. | | 711/205 |

OTHER PUBLICATIONS

Jung-Hi Min, Jung-Hoon Lee, Seh-Woong Jeong, Adn Shin-Dug Kim, A Selectively Accessing TLB for High Performance and Lower Power Consumption, Parallel Processing Laboratory, Dept. of Computer Science, Yonsei University, Seoul 120-749, Korea.

* cited by examiner

*Primary Examiner* — Matthew Bradley
*Assistant Examiner* — Kalpit Parikh
(74) *Attorney, Agent, or Firm* — Stolowitz Ford Cowger LLP (57) ABSTRACT

Multiple pipelined Translation Look-aside Buffer (TLB) units are configured to compare a translation address with associated TLB entries. The TLB units operated in serial order comparing the translation address with associated TLB entries until an identified one of the TLB units produces a hit. The TLB units following the TLB unit producing the hit might be disabled.

18 Claims, 7 Drawing Sheets

TRANSLATION LOOK-ASIDE BUFFER WITH VARIABLE PAGE SIZES

TECHNICAL FIELD

The present disclosure relates generally to the field of computer architecture.

BACKGROUND

Translation Look-Aside Buffers (TLBs) include entries that specify the mapping of virtual addresses to physical addresses. The TLB is often used when a computer system needs to translate a limited number of address bits into a larger memory space. For example, a computer system that uses a 32 bit address bus may need to access a memory space larger than $2^{32}$ bits.

Embedded processors may have area constraints that limit the amount of storage provided for the TLB entries. Variable page sizes can increase the flexibility in using the limited TLB entries. Variable page size TLBs are often implemented using either a Content Addressable Memory (CAM) or using a limited choice of page sizes segregated into individual memory arrays. The individual memory arrays become a scarce resource that must be carefully managed by software when a large number of page sizes are required, and the CAM implementation consumes considerable power.

OVERVIEW

A Translation Look-aside Buffer (TLB) is divided into a number of TLBs and may be implemented using Content Addressable Memories (CAMs). The CAM lookups are performed serially in pipelined fashion.

DESCRIPTION OF EXAMPLE EMBODIMENTS

Network Processing System

Figure 1:
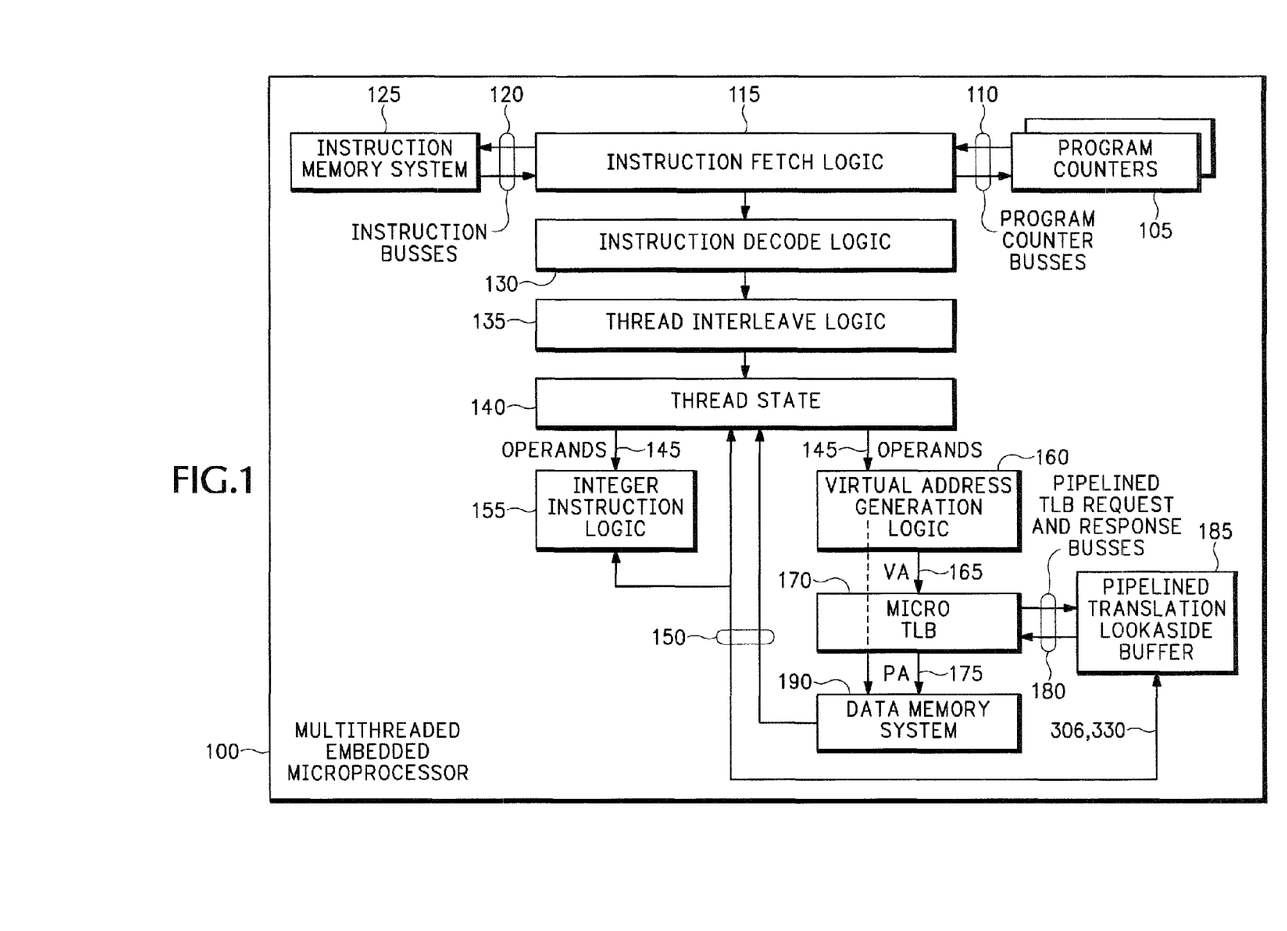
FIG. 1 is a block diagram of a multithreaded embedded processor that uses a pipelined Translation Look-aside Buffer (TLB).

FIG. 1 is a block diagram of a multithreaded embedded microprocessor 100 that might be used in conjunction with a pipelined Translation Book-aside Buffer (TLB) 185. Of course the pipelined TLB 185 described below can be used in any computer system or computer architecture that uses address translation. For example, the pipelined buffering scheme described below can be used with Personal Computers (PCs), supercomputers, Personal Digital Assistants (PDAs), Digital Signal Processors (DSPs), packet processing systems, etc. The following description is included to illustrate the operation of preferred embodiments rather than to limit the scope of the disclosure.

Multiple program counters 105 hold the location in instruction memory 125 for the next instructions to be fetched for associated threads supported by the multithreaded embedded microprocessor 100. Program counter busses 110 convey the program counters to instruction fetch logic 115 and convey updates from instruction fetch logic 115 to program counters 110. Instruction fetch logic 115 sequences instruction fetches from instruction memory system 125, detects exceptions related to instruction fetching, and identifies instruction boundaries.

Instruction busses 120 convey instruction addresses from instruction fetch logic 115 to instruction memory system 125, and convey results from instruction memory system 125 back to instruction fetch logic 115. Instruction memory system 125 looks up instructions using a Static Random Access Memory (SRAM) or caches and returns the instructions to instruction fetch logic 115.

Instruction fetch logic 115 sends raw instruction bytes to instruction decode logic 130 for mapping the raw instruction bytes to control signals required to operate multithreaded embedded microprocessor 100. Thread interleave logic 135 examines the control signals from instruction decode logic 130 and past history to determine which thread should execute the next instruction.

Based on the result of thread interleave logic 135, thread state 140 produces operands 145 for integer instruction logic 155 and for virtual address generation logic 160. Results from integer instruction logic 155 and data memory system 190 are used to update the thread state 140 via result busses 150. Integer instruction logic 155 uses operands 145 and signals from instruction decode logic 130 to evaluate integer operations such as addition, subtraction, shifting and masking.

Virtual address generation logic 160 uses operands 145 to compute a Virtual Address (VA) 165 using shifting and addition. The virtual address 165 is passed to a micro TLB 170. Micro TLB 170 converts the virtual address 165 into a Physical Address (PA) 175. Micro TLB 170 contains a small cache of virtual address to physical address translations to support low latency lookups, but may suffer a higher miss rate than a larger TLB.

Micro TLB 170 posts miss requests over TLB request and response busses 180 to the pipelined translation look-aside buffer 185. Results from the pipelined translation look-aside buffer 185 are transmitted back to micro TLB 170 over TLB request and response busses 180. Data memory 190 acts on the address from bus PA 175 and operands 145 to perform memory load and store operations. The results from data memory 190 are returned to thread state 140 over result busses 150 and may include addresses, data or any other information needed by the integer instruction logic 155 for conducting logic operations. When the microprocessor 100 is used for packet processing, the data memory system 190 may also contain packet data. The integer instruction logic 155 can also be used to read and write entries in the pipelined TLB 185 via busses 306 and 330.

As described above, the multithreaded processor 100 may need to access a larger physical memory space PA 175 than what is provided by the internal virtual address space VA 165. Accordingly, the TLBs 170 and 185 provide virtual to physical address translations that increase the size of physical address space accessible by the multiple threads in processor 100.

Pipelined TLB 185 holds a large number of address translations and is permitted to perform translations with a higher latency than micro TLB 170. Even though the CAMs used in pipelined TLB 185 are generally relatively slow, the pipelined TLB 185 can still provide one address translation per clock cycle to avoid stalling of unrelated threads.

In one embodiment, the pipelined TLB 185 provides fully associative memory mapping with the power advantages of set-associative memory mapping. The pipelining structure in TLB 185 is also well adapted to the multi-threaded processor 100 described in FIG. 1 where multiple memory lookups may be evaluated in parallel.

Address Translation

Figure 2:
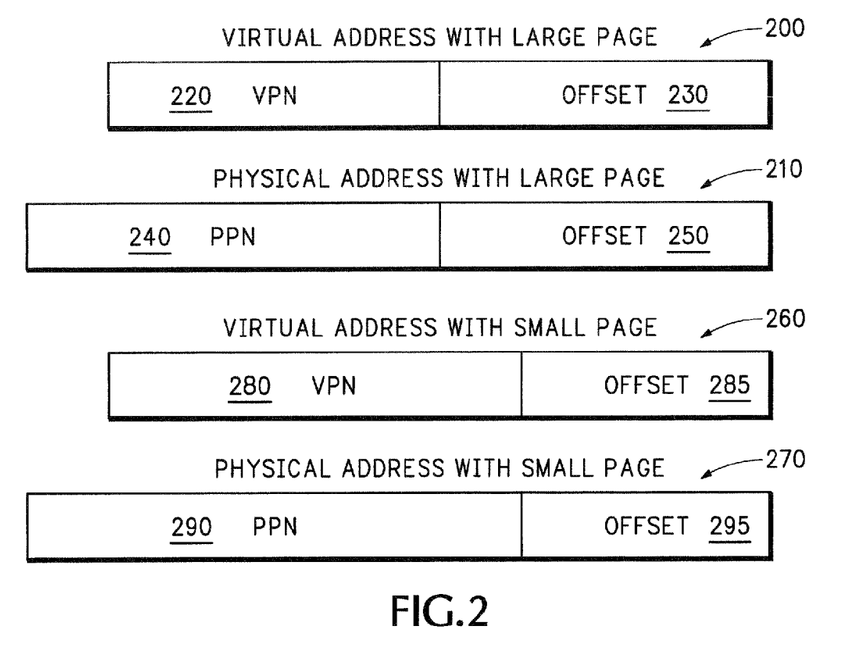
FIG. 2 is a diagram illustrating address translation.

FIG. 2 is a diagram illustrating two address translation cases as might be used in the embedded microprocessor 100 shown in FIG. 1. A virtual address with a large page 200 is represented by the two subfields. Virtual Page Number (VPN) 220 and offset 230. The VPN 220 represents an index into a table that associates a physical page number 240 with virtual page number 220. The offset 230 is the displacement of the virtual address within the virtual page identified by VPN 220.

Physical address with a large page 210 is the physical address corresponding to virtual address with large page 200. The VPN 220 is replaced with the corresponding Physical Page Number (PPN) 240. The offset 250 is identical to offset 230 and is the displacement within the physical page associated with PPN 240. The VPN 220 is used as the VA input 165 for the micro TLB 170 and pipelined TLB 185 shown in FIG. 1. The output of TLBs 170 and 185 in FIG. 1 is the PPN 240 shown in FIG. 2. As can be seen, the PPN 240 contains more bits than the VPN 220. Accordingly, the lookups provided by TLBs 170 and 185 allow the microprocessor 100 to access a large physical memory space.

Virtual address with small page 260 represents a virtual address that has two subfields, VPN 280 and offset 285. Compared to the virtual address with large page 200, the VPN field 280 is larger than VPN field 220. The virtual address with smaller page size 260 is used for applications that may use a larger number of smaller pages. Accordingly, offset field 285 is smaller than the offset field 230 since the smaller pages used in virtual address 260 have smaller maximum offsets.

Similar to virtual address 200, virtual address with small page 260 can be translated to a physical address with small page 270 by the same TLBs 170 and 185 shown in. The VPN 280 can be thought of as indexing a table associating virtual page numbers with physical page numbers. The result of the table lookup is the physical address PPN 290 for a smaller page size. Offset 295 is the displacement within in the physical page identified by PPN 290 and is identical to offset 285. Since the physical pages 290 are smaller in size, the offset 295 into each page is also smaller than the offsets 250 used for larger page sizes.

Larger page sizes may be used for large contiguous data structures. This would require fewer entries in the TLB 185. On the other hand, smaller data structures may be more efficiently stored in memory with the smaller page sizes used in virtual address 260. The VPN 280 could be another input VA 165 into the TLBs 170 and 185. The PPN 290 would then be provided as output PA 175 in FIG. 1.

The pipelined TLB 185 in FIG. 1 provides translations for any combination of different page sizes allowing more efficient memory access and memory utilization.

Pipelined Translation Look-Aside Buffering

Figure 3:
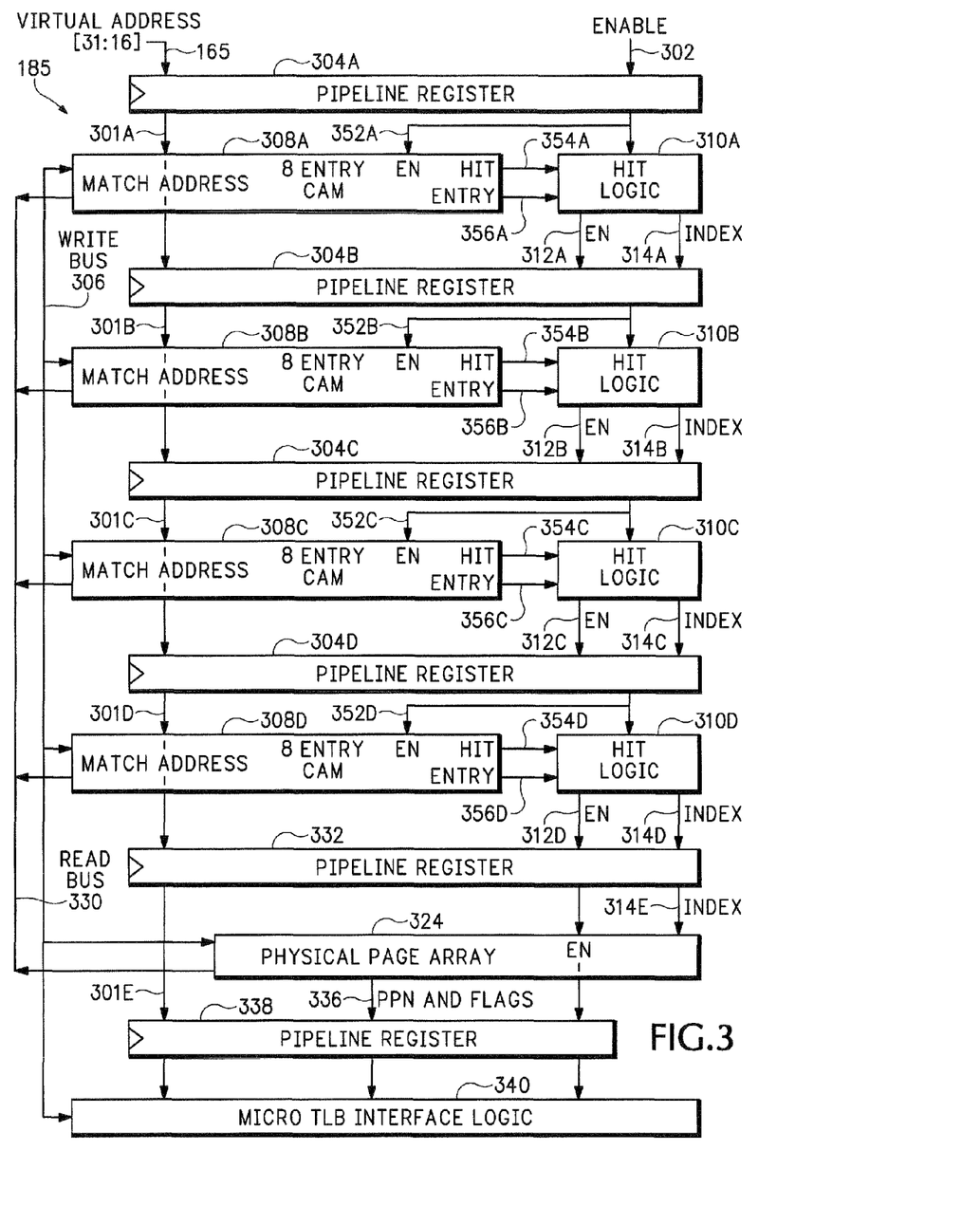
FIG. 3 is a block diagram showing one embodiment of the pipelined TLB.

FIG. 3 is a block diagram showing one embodiment of the pipelined TLB 185 of FIG. 1 in more detail. Virtual Address [31:16] 165 is captured in a pipeline register 304A along with an enable signal 302. Enable 302 is set to a logic value 1 to enable the pipeline TLB 185 to translate for a virtual address 165 into a physical address 175 (FIG. 1). In this embodiment, virtual address 165 represents the largest field for any virtual address that may contain a VPN. For example, in FIG. 2 there are two possible VPN sizes, VPN 220 and VPN 280. In this case, virtual address 165 would be at least as large as VPN 280. Of course, other virtual address field sizes and techniques can be used in the address translation.

In response to the virtual address 165 and the enable 302, pipeline registers 304A-304D serially apply logic values to 8 entry CAM units 308A-308D and hit logic 310A-310D, respectively. Each of the 8 entry CAM units 308A-308D accept a registered address 301A-301D and an enable signal 352A-352D, respectively, from a preceding pipeline register 304. The registered address 301 and enable 352 are used by the subsequent CAM stage as a search key and enable.

The enable signals 352A-352D can be used to place the CAMs 308A-308D, respectively, in low power modes when not in use. Numerous circuit techniques such as clock gating key values or masking inputs can also be used to implement the enable functions. The CAMs 308A-304D produce hit signals 354A-354D, respectively, that indicate a match between registered address 301 and at least one of the associated 8 CAM entries. Each of the CAMs 308A-308D produce an entry indication 356A-356D, respectively, that in conjunction with the hit signal 354A-354D identifies which of the CAM entries match the registered virtual address 301.

The hit logic 310 uses the incoming enable signal 352, hit signal 354, and entry information 356 to then produce an enable 312 and index 314 for a next pipeline stage. The enable 312 disables CAMs 308 in subsequent pipeline stages when a hit is detected in any of the previous pipeline stages. The location of the matching CAM entry is converted into a 5-bit address 314 that provides an index into a physical page array 324. Examples of the functions performed in the hit logic 310 are summarized in the following tables:

| Enable Input | Index Input | Hit Input from CAM | Entry Input from CAM | en Output | index Output |
|---|---|---|---|---|---|
| 0 | iiiii | — | — | 0 | iiiii |
| 1 | — | 0 | — | 1 | 00000 |
| 1 | — | 1 | iii | 0 | cciii |

| Hit Logic Instance | cc |
|---|---|
| 310A | 00 |
| 310B | 01 |
| 310C | 10 |
| 310D | 11 |

Operation

For explanation purposes, assume that the virtual address 165 matches the second entry [010] in the third CAM 308C. Numbers contained within brackets [ ] refer to binary values. The first CAM 308A receives an activated enable input 352A. However, there are no entries in the first CAM 308A that match registered virtual address 301A. According, hit input 354A from CAM 308A is zero. This causes hit logic 310A to set enable 312A high and set the index 314A to [0000]. Activated enable signal 312A causes CAM 308B to compare CAM entries with the registered virtual address 301B. There are no entries in CAM 308B that match virtual address 301B. Accordingly, the hit signal 354B from CAM 308B is zero and entry signal 356B from CAM 308B is a "don't care". Hit logic 310B sets enable 312B high and sets the index value 314B to [00000].

The active high enable 352C enables comparison of entries in CAM 308C with registered virtual address 301C. In this example, the virtual address 301C matches the second entry in CAM 308C. The CAM 308C accordingly sets the hit line 354C high and sets the entry lines 356C to [010]. Hit logic 310C sets the enable output 312C to zero and sets the index 314C to [10010] indicating the [10] CAM 308C and the [010] entry in CAM 308C.

The zeroed enable output 312C causes the hit logic 310D and any other subsequent TLB pipeline stages to generate a zero on their enable lines 352 and forward the index value [10010] through to the pipeline register 332 and physical page array 324.

Physical page array 324 contains the page attributes and physical page numbers corresponding to the virtual page information obtained from CAMs 308A-308D. For this example, the index value 314E from pipeline register 332 is [10010] and is used as an address for identifying a Physical Page Number (PPN) stored in physical page array 324. The physical page array can be SRAM or an array of latches. The resulting PPN value is placed on PPN and flags bus 336 and passed to pipeline register 338. A delayed copy of the original virtual address 301E is also supplied to pipeline register 338.

Software can store translations in the 8 entry CAMs 308A-308D and physical page array 324 such that the most frequently used translations are located in the earliest possible CAMs 308 in the pipeline. This reduces the average number of CAMs 308 that are enabled for a given address translation and in turn reduces the amount of power required to perform the virtual to physical address translation.

This power optimization is possible because certain regions of memory, such as the stack, are more frequently used than other regions of memory. A programmer can populate the TLB entries associated with these high touch stack operations in the upper CAMs 308A and 308B. Other less frequently used physical memory space, such as the memory used for initial configuration of the processor 100, may be located in lower CAMs 308C and 308D.

Write bus 306 is used by the processor 100 from FIG. 1 to update the values in CAMs 308A-308D and update the values in physical page array 334 in response to software-programmed instructions. Similarly, software-programmed instructions can be used to inspect values in the CAMs 308A-308D and physical page array 324 using read bus 330.

Micro TLB interface logic 340 performs several functions including replacing or combining the registered virtual address 301D with the PPN and flags 336 from pipeline register 338 to form an entry suitable for micro TLB 170 from FIG. 1. For example, one of the outputs from pipeline register 338 may be one of the physical addresses and offset values 210 or 270 from FIG. 2. Micro TLB interface logic 340 keeps track of which threads access the CAMs 308 and physical page array 324 and also holds information that assists in maintaining coherence between micro TLB 170 and the pipelined TLB 185.

The pipelining used in TLB 185 has several advantages. Once a CAM entry is matched, the remaining CAM accesses can be suppressed to save power. Also, in a multi-threaded processor, accesses from multiple threads can be simultaneously "in flight" for a throughput of one TLB interrogation per cycle. As mentioned above, the most frequently accessed pages can be stored in the upper CAM banks to further reduce CAM power consumption.

The number of address mappings stored in an embedded processor requires optimization because loading new mappings into a TLB can use additional clock cycles. This can be problematic for real-time programs executing on the embedded processor 100. The variable page sizes provided in the pipelined TLB 185 reduces the number of re-mappings that are required by these real-time programs.

Multiple different page sizes may be used in any of the CAMs 308 simply by loading the address corresponding with the associated registered virtual address 301 and page size into the CAM 308. Then masking bits are written into the CAM 308 that correspond with the page size length. This masking is described in more detail in FIG. 6.

One simplification is to allow translation of exactly one page size, typically the smallest page size defined in the architecture. In one embodiment this is 64 kB, corresponding to a 16-bit-wide VPN. Page size is encoded in the flag information 336 from physical page array 324 and is used by the micro TLB interface logic 340 to combine the VA 165, and PPN to form pages of a fixed 64 KiloBytes (kB) size. The pipelined TLB 185 can support any page size, but in one embodiment the page sizes are 64 kB, 256 kB, 1 MB, 4 MegaBytes (MB), 16 MB, 64 MB, 256 MB and 1 GigaBytes (GB). For these sizes, the micro TLB interface logic 340 may produce results summarized in the following table.

| Page Size | Size Encoding | Result PPN[15:0] |
|---|---|---|
| 64 kB | 000 | PPN[15:0] |
| 256 kB | 001 | {PPN[15:2], VPN[1:0]} |
| 1 MB | 010 | {PPN[15:4], VPN[3:0]} |
| 4 MB | 011 | {PPN[15:6], VPN[5:0]} |
| 16 MB | 100 | {PPN[15:8], VPN[7:0]} |
| 64 MB | 101 | {PPN[15:10], VPN[9:0]} |
| 256 MB | 110 | {PPN[15:12], VPN[11:01]} |
| 1 GB | 111 | {PPN[15:14], VPN[13:0]} |

Microprocessor 100 in FIG. 1 includes instructions that synchronize program execution with software-initiated changes to pipelined TLB 185. There are different types of synchronization instructions including single thread synchronization and multiple thread synchronization. Micro TLB interface logic 340 can snoop write bus 306 and set all bits in an array of storage elements corresponding to each thread existing on processor 100. These bits are called thread dirty bits. Both the single thread and multiple thread synchronization instructions examine the thread dirty bits to conditionally flush micro TLB 170.

Single thread synchronization instructions inspect the thread dirty bit corresponding to the thread that executed the single thread synchronization instruction. If the thread dirty bit is set, then translations in micro TLB 170 corresponding to the thread that executed the single thread synchronization instruction are invalidated, or flushed. Following the flush, the thread dirty bit corresponding to the thread that executed the single thread synchronization instruction is cleared. Multiple thread synchronization instructions inspect all of the thread dirty bits. If any of the thread dirty bits are set, all the entries in micro TLB 170 are flushed and all of the thread dirty bits are cleared.

The micro TLB 170 in FIG. 1 is a translation look-aside buffer that has simplifications to facilitate low latency operation. For example, the micro TLB 170 could operate similar to a single one of the 8 entry CAMs 308 and provide a one clock cycle output. The micro TLB 170 can be used for applications that cannot wait for the initial few clock cycles required to fill the pipelined TLB 185. In another embodiment, there may not be a micro TLB 170 and only the pipelined TLB 185 is used in processor 100.

Multi-Thread Pipelining

Figure 4:
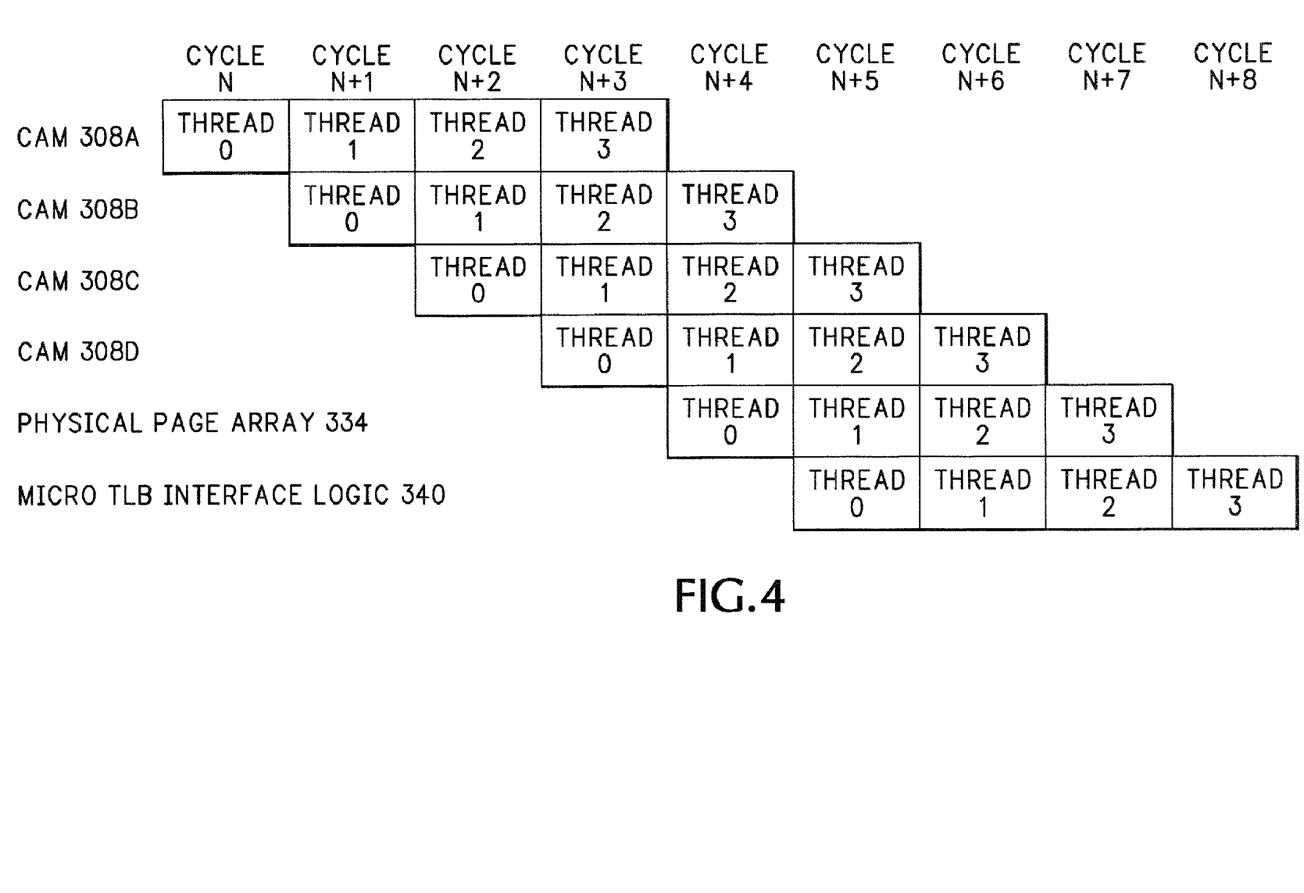
FIG. 4 is a pipeline diagram illustrating translations performed by the pipelined TLB from multiple threads.

FIG. 4 is a pipeline diagram illustrating translations from multiple threads in one embodiment of the pipelined TLB. Referring to FIGS. 3 and 4, in clock cycle n, a translation for thread 0 enters CAM 308A. In a following clock cycle, cycle n+1, the translation for thread 0 enters CAM 308B and an unrelated translation from thread 1 enters CAM 308A.

Depending on the values generated by hit logic 310A, thread 0 may interrogate CAM 308B in cycle n+1, regardless of the outcome of thread 1's interrogation of CAM 308A. The pattern of cycle n and cycle n+1 is repeated through cycle n+8 until all four threads have completed their translations and results have passed through micro TLB interface logic 340.

Starting at cycle n+5, one address translation is output every subsequent clock cycle. Thus, the pipeline TLB 185 provides better translation rates than TLBs that may take multiple clock cycles. FIG. 4 shows one example of a 4 thread pipeline, but the pipelined TLB 185 can operate on more or fewer threads. Threads may make requests to the pipelined TLB in any order.

Content Addressable Memory

Figure 5:
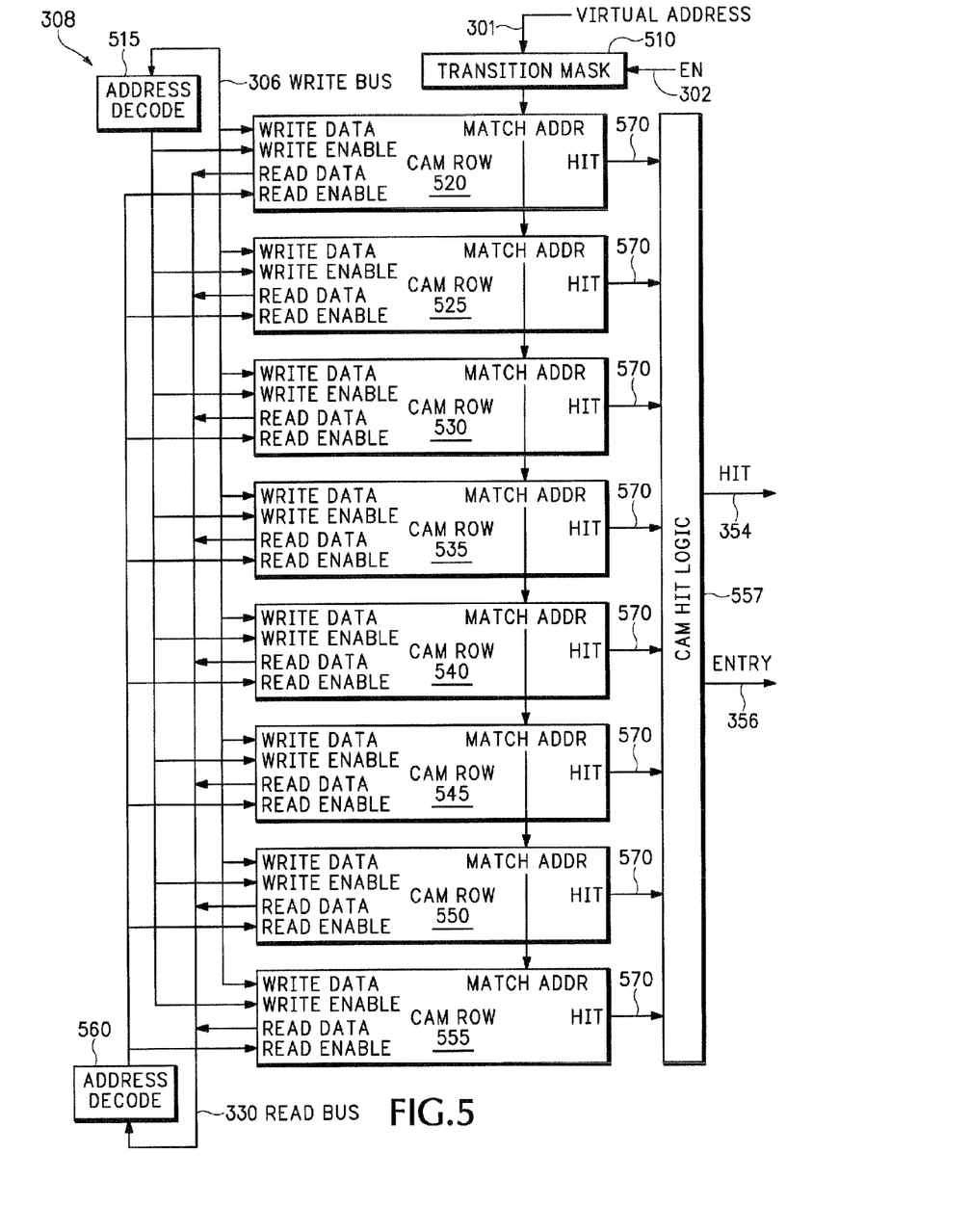
FIG. 5 is a block diagram showing one embodiment of a Content Addressable Memory (CAM) bank.

FIG. 5 is a block diagram showing one example for one of the 8 entry CAMs 308 used in FIG. 3. The registered virtual address 301 enters a transition mask 510 and is gated with enable signal 302. The output of transition mask 510 is broadcast to the registered address inputs of CAM rows 520, 525, 530, 535, 540, 545, 550 or 555. When the 8 entry CAM 308 is disabled by enable signal 302, logic level changes on registered virtual address 301 do not reach the CAM rows. The CAM rows 520, 525, 530, 535, 540, 545, 550 or 555 continuously broadcast hit signals 570 indicating that the CAM row either matches or does not match the registered address 301. In an alternative embodiment, the virtual address 165 may come from a clock gated register that prevents changes in the virtual address 301 from reaching the CAM rows when the enable 302 is low.

In one embodiment, the CAM rows 520, 525, 530, 535, 540, 545, 550 or 555 are static logic that does not include a clock. By disabling transitions in the virtual address 301 when a hit is detected in an earlier pipeline stage, the logic in the CAM rows 520, 525, 530, 535, 540, 545, 550 or 555 does not change state and in turn uses less power. If clocked CAMs are used, the evaluation phase of the CAMs could be disabled by disabling the associated clock signals.

The CAM hit logic 557 accepts hit signals 570 from the CAM rows and produces two combinational results. The hit signal 354 is the or-reduction of the hit signals 570 from CAM rows 520, 525, 530, 535, 540, 545, 550 and 555. The entry 356 is prioritized and encoded as shown in the following table for providing part of the index 314 used for accessing the physical page array 324.

Write bus 306 is used to load translations into the CAM rows. Address bits and enable signals from write bus 306 are converted into write enable signals by address decode logic 515, which then sends individual write enables to CAM rows 520, 525, 530, 535, 540, 545, 550 and 555.

The read bus 330 reads translations from the CAM rows. Address bits from read bus 330 are converted into read enable signals by address decode logic 560, which then sends individual read enables to the CAM rows 520, 525, 530, 535, 540, 545, 550 and 555. The translation data is combined on read bus 330.

Figure 6:
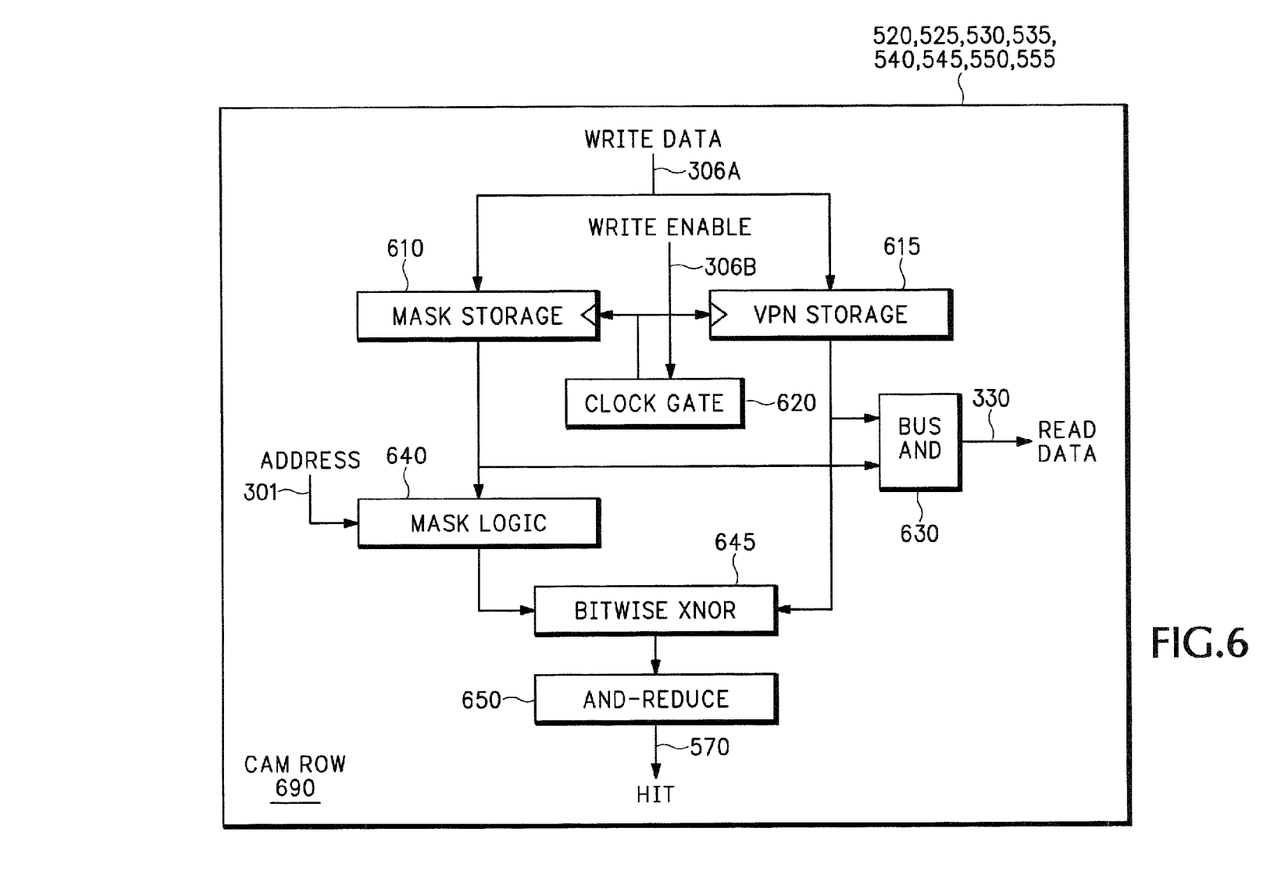
FIG. 6 is a block diagram showing one embodiment of a CAM row.

FIG. 6 is a block diagram for one of the CAM rows 520, 525, 530, 535, 540, 545, 550 and 555 shown in FIG. 5. Write data 306A from write bus 306 contains data to be written into the CAM row. When a write enable 306B is at a logic high level, clock gate 620 allows a clock pulse to propagate to mask storage registers 610 and VPN storage registers 615. The output of mask storage register 610 is inverted and logically ANDed with the registered address 301 input in mask logic 640. Logic 640 masks out the address bits 301 that should not participate due the page size in the address comparison. The outputs of mask storage 610 and VPN storage 615 are received by bus AND logic 630 before being output on read data bus 330.

The masked address from mask logic 640 is compared with the output of register VPN storage 615 in bitwise XNOR 645. The output of bitwise XNOR 645 is an array of bits that correspond to each bit of registered address 301. An output bit of bitwise XNOR 645 is at a logic high value when a bit from mask logic 640 and VPN Storage 615 are at the same logic value. The AND-reduce logic 650 computes the logical AND of all the output bits of bitwise XNOR 645 to generate the hit signal 570 for the CAM row. Many alternatives implementations could also be used to implement the CAM rows.

Figure 7:
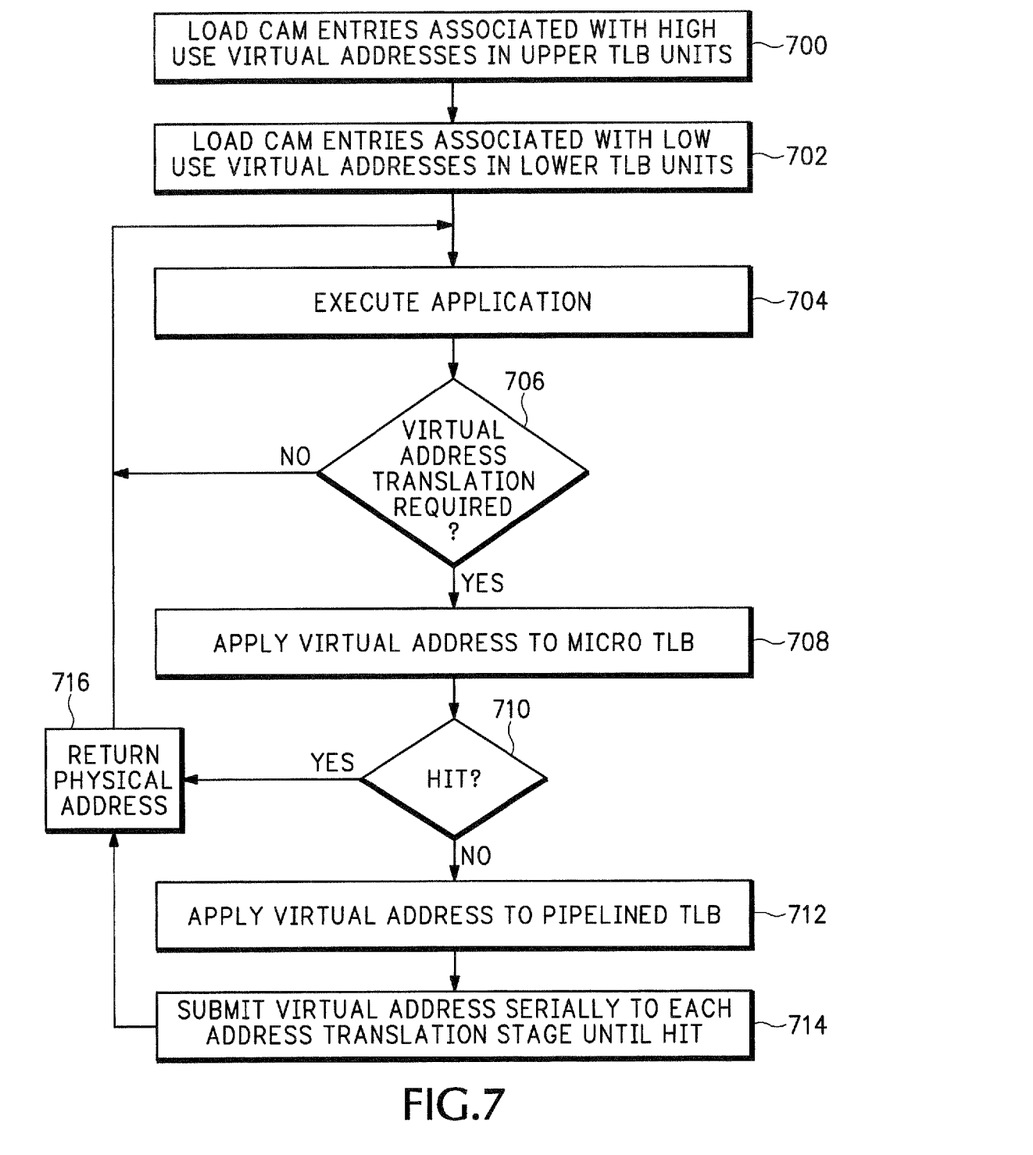
FIG. 7 is a flow diagram explaining one possible set of operations for the processor in FIG. 1.

FIG. 7 explains one example operation of the embedded processor 100 and TLBs 170 and 185 in FIG. 1. In operation 700, the CAM entries associated with high use virtual addresses are loaded into the upper TLB units 308A and 308B of FIG. 3. In operation 702, the CAM entries associated with lower use virtual addresses are loaded into the lower TLB units 308C and 308D of FIG. 3. Operation 704 then executes an application program, such as a multithreaded packet processing application.

One of the threads in the microprocessor 100 may require a translation of a virtual address into a physical address in operation 706. In this case, the virtual address may first be supplied to the micro TLB 170 in operation 708. If the micro TLB registers a hit in operation 710, the physical address associated with the hit is returned by the micro TLB 170 in operation 716.

| Hit from 520 | Hit from 525 | Hit from 530 | Hit from 535 | Hit from 540 | Hit from 545 | Hit from 550 | Hit from 555 | entry 356 |
|---|---|---|---|---|---|---|---|---|
| 0 | 0 | 0 | 0 | 0 | — | — | — | 000 |
| 1 | — | — | — | — | — | — | — | 000 |
| 0 | 1 | — | — | — | — | — | — | 001 |
| 0 | 0 | 1 | — | — | — | — | — | 010 |
| 0 | 0 | 0 | 1 | — | — | — | — | 011 |
| 0 | 0 | 0 | 0 | 1 | — | — | — | 100 |
| 0 | 0 | 0 | 0 | 0 | 1 | — | — | 101 |
| 0 | 0 | 0 | 0 | 0 | 0 | 1 | — | 110 |
| 0 | 0 | 0 | 0 | 0 | 0 | 0 | 1 | 111 |

If the micro TLB 170 does not register a hit the virtual address is supplied to the pipelined TLB 185 in operation 712. The pipelined TLB in operation 714 then conducts the pipelined translation look-aside buffering described above in FIG. 3. The virtual address is serially applied to each CAM unit until a match is detected. Any CAM address translation stage following the CAM hit are disabled. The index associated with the matching CAM unit and the particular matching CAM entry are then used to identify a physical address. The physical address is returned to the thread requesting the address translation in operation 716.

Several preferred examples of the present application have been described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I/we claim all modifications and variation coming within the spirit and scope of the following claims.

The invention claimed is:

1. An apparatus, comprising:
a pipelined Translation Look-aside Buffer (TLB) including multiple TLB units, each configured to store TLB entries of translation addresses, wherein the multiple TLB units are serially coupled and configured to concurrently compare different translation addresses to the TLB entries stored by the multiple TLB units, wherein the pipelined TLB units are configured to prevent one or more of the pipelined TLB units from comparing the associated TLB entries with a particular translation address in response to a hit on the particular translation address in one of the TLB units; and
a non-pipelined micro TLB unit, separate from the multiple TLB units in the pipelined TLB, configured to forward the different translation addresses to the pipelined TLB when no hit is produced for the different translation addresses in the non-pipelined micro TLB unit.

2. The apparatus according to claim 1 wherein each of the TLB units comprise a separate Content Addressable Memory (CAM) configured to disable all subsequent CAMs for the particular translation address when the particular translation address produces the hit.

3. The apparatus according to claim 1 wherein the pipelined TLB includes pipeline registers located between each of the TLB units.

4. The apparatus according to claim 1 wherein the pipelined TLB includes hit logic associated with each of the TLB units, the hit logic generating an enable signal for a next TLB unit according to a hit indication received from the associated TLB units.

5. The apparatus according to claim 4 wherein the hit logic generates an index corresponding to any TLB entries that match the different translation addresses, the index identifying a physical address in a physical address array.

6. The apparatus according to claim 1 further comprising a multi-threaded processor that pipelines the different translation addresses associated with different threads towards the TLB units.

7. The apparatus according to claim 1 wherein the TLB entries are associated with translation addresses having variable page sizes.

8. A method, comprising:
comparing an address with entries in a non-pipelined address translation buffer;
comparing the address with entries in a current address translation stage when none of the entries in the non-pipelined address translation buffer match the address;
comparing the address with entries in one or more subsequent address translation stages when the entries in the current address translation stage do not match the address, and concurrently comparing a different address with the entries in the current address translation stage; and
preventing at least one of the subsequent address translation stages from comparing entries with the address in response to a match between the address and at least one of the entries in at least a different one of the subsequent address translation stages.

9. The method according to claim 8 further comprising generating an index value identifying which address translation stage having the matching entry and also identifying which entry in the identified address translation stage matches the address.

10. The method according to claim 8 further comprising:
registering the address for each address translation stage; and
registering address comparison results for each address translation stage.

11. The method according to claim 8 including:
loading entries associated with more frequently used addresses in upper address translation stages; and
loading entries associated with less frequently used addresses in lower address translation stages.

12. The method according to claim 8 further comprising:
operating multiple different threads; and
pipelining address translation requests for the different threads through the current address translation stage and the next address translation stage so that one address translation is generated each clock cycle.

13. The method according to claim 8 further comprising loading entries in address translation stages that are associated with different virtual address page sizes.

14. An apparatus, comprising:
multiple Content Addressable Memory (CAM) units serially coupled and configured to concurrently compare different virtual addresses with associated CAM entries respectively stored by the multiple CAM units, wherein the multiple CAMs are configured to receive the different virtual addresses from a micro Translation Look-Aside Buffer, that is separate from the multiple CAMs, when no hit is produced for the different virtual addresses in the micro Translation Look-Aside Buffer;
pipeline registers coupled between the CAM units to serially move the different virtual addresses through the multiple CAM units; and
pipeline logic associated with the CAM units to enable a next one of the multiple CAM units to compare a next one of the virtual addresses when none of the CAM entries in a current one of the multiple CAM units match a current one of the virtual addresses, wherein the pipeline logic is configured to disable one or more of the multiple CAM units when at least one of the CAM entries in the current one of the CAM units matches the current one of the virtual addresses.

15. The apparatus according to claim 14 wherein the pipeline logic generates an index, the index corresponding to one of the CAM units and one of the associated CAM entries that matches the current one of the virtual addresses.

16. The apparatus according to claim 15 further comprising a physical page array including one or more physical addresses accessible by the index.

17. The apparatus according to claim 14 wherein the CAM units include multiple CAM rows each having an address input that is selectively enabled or disabled by the pipeline logic associated with a previous one of the CAM units.

18. The apparatus according to claim 14 wherein the virtual address is used for packet processing in an embedded microprocessor.

* * * * *